(12) United States Patent
Jones et al.

(10) Patent No.: US 8,286,134 B2
(45) Date of Patent: Oct. 9, 2012

(54) CALL STACK SAMPLING FOR A MULTI-PROCESSOR SYSTEM

(75) Inventors: Scott Thomas Jones, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/173,107

(22) Filed: Jul. 15, 2008

(65) Prior Publication Data

US 2010/0017584 A1   Jan. 21, 2010

(51) Int. Cl.
  *G06F 9/44* (2006.01)
(52) U.S. Cl. .................................................. 717/124
(58) Field of Classification Search .................. 717/124
  See application file for complete search history.

(56) References Cited

U.S. PATENT DOCUMENTS

| | | | |
|---|---|---|---|
| 5,768,500 A * | 6/1998 | Agrawal et al. | 717/130 |
| 6,199,075 B1 | 3/2001 | Ungar | |
| 6,651,243 B1 * | 11/2003 | Berry et al. | 717/130 |
| 6,751,789 B1 * | 6/2004 | Berry et al. | 717/130 |
| 6,874,074 B1 | 3/2005 | Burton et al. | |
| 6,954,922 B2 * | 10/2005 | Liang | 717/130 |
| 7,028,298 B1 | 4/2006 | Foote | |
| 7,093,081 B2 | 8/2006 | DeWitt, Jr. et al. | |
| 7,114,036 B2 | 9/2006 | DeWitt, Jr. et al. | |
| 7,278,141 B2 | 10/2007 | Accapadi et al. | |
| 7,296,130 B2 | 11/2007 | Dimpsey et al. | |
| 7,325,108 B2 | 1/2008 | Tuel | |
| 7,574,587 B2 * | 8/2009 | DeWitt et al. | 712/227 |
| 7,610,585 B2 | 10/2009 | Shpeisman et al. | |
| 7,624,137 B2 | 11/2009 | Bacon et al. | |
| 8,191,049 B2 * | 5/2012 | Levine et al. | 717/127 |
| 2002/0073103 A1 | 6/2002 | Bottomley et al. | |
| 2003/0023655 A1 | 1/2003 | Sokolov et al. | |
| 2004/0163077 A1 * | 8/2004 | Dimpsey et al. | 717/130 |
| 2005/0086455 A1 * | 4/2005 | DeWitt et al. | 712/227 |
| 2005/0102493 A1 * | 5/2005 | DeWitt et al. | 712/227 |
| 2005/0149585 A1 | 7/2005 | Bacon et al. | |
| 2005/0155018 A1 * | 7/2005 | DeWitt et al. | 717/124 |
| 2005/0155019 A1 * | 7/2005 | Levine et al. | 717/127 |
| 2005/0273782 A1 | 12/2005 | Shpeisman | |
| 2006/0130001 A1 * | 6/2006 | Beuch et al. | 717/130 |
| 2006/0212657 A1 | 9/2006 | Tuel | |
| 2008/0189687 A1 * | 8/2008 | Levine et al. | 717/128 |

OTHER PUBLICATIONS

Froyd et al., "Low-Overhead Call Path Profiling of Unmodified, Optimized Code", ACM, ICS'05 Cambridge, Massachusetts, pp. 81-90.

Chanda et al., "Whodunit: Transactional Profiling for Multi-Tier Applications", ACM, EuroSys'07, Mar. 2007 Lisboa, Portugal, pp. 17-30.

(Continued)

*Primary Examiner* — Wei Zhen
*Assistant Examiner* — Junchun Wu
(74) *Attorney, Agent, or Firm* — Yee & Associates, P.C.; David A. Mims, Jr.

(57) ABSTRACT

A computer implemented method for sampling call stack information. Responsive to identifying a set of interrupts, a determination is made as to whether all processors in a plurality of processors have generated the set of interrupts. A number of addresses are identified for a set of interrupted threads identified by the set of interrupts response to a determination that all of the processors have generated the set of interrupts. A determination is made as to whether the identified address falls within a set of address ranges. Responsive to a determination that the identified address falls within the set of address ranges, a sampler thread is notified to obtain call stack information.

14 Claims, 9 Drawing Sheets

OTHER PUBLICATIONS

Binder, "Portable and Accurate Sampling Profiling for Java", Software-Practice and Experience, vol. 36, Issue 6, May 2006, pp. 615-650.

Dunlavey, "Performance Tuning with Instruction-Level Cost Derived from Call-Stack Sampling", ACM SIGPLAN Notices, vol. 42(8), Aug. 2007, pp. 4-8.

USPTO office action for U.S. Appl. No. 12/235,302 dated Jul. 20, 2011.

USPTO Office Action for U.S. Appl. No. 12/235,302 dated Feb. 2, 2011.

Sun Java Real-Time System 2.0_01, Garbage Collection Guide, Nov. 21, 2007 http://download.oracle.com/javase/realtime/doc_2.0_u1/release/JavaRTSGarbageCollection.html.

AIX Versions 3.2 and 4 Performance Tuning Guide, Performance Overview of the Virtual Memory Manager (VMM, Apr. 1997 http://nfosolutions.com/doc_link/C/a_doc_lib/aixbman/prftungd/vm-mov.htm.

* cited by examiner

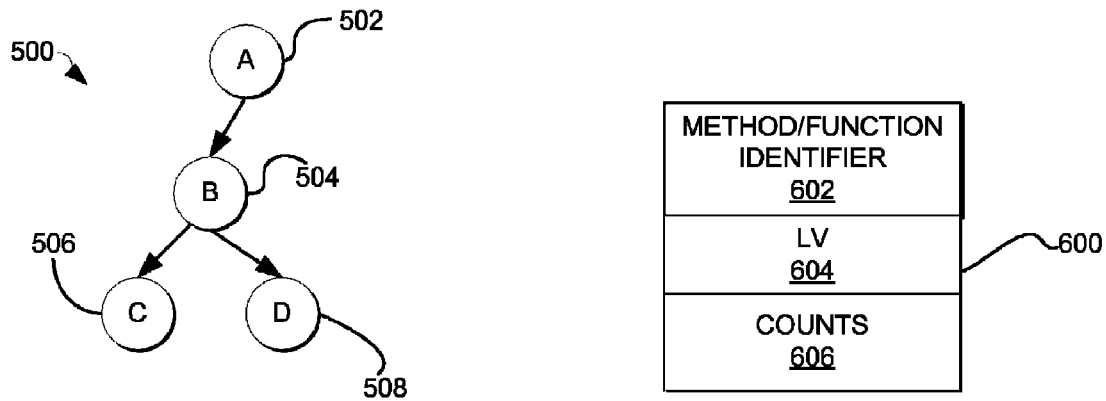
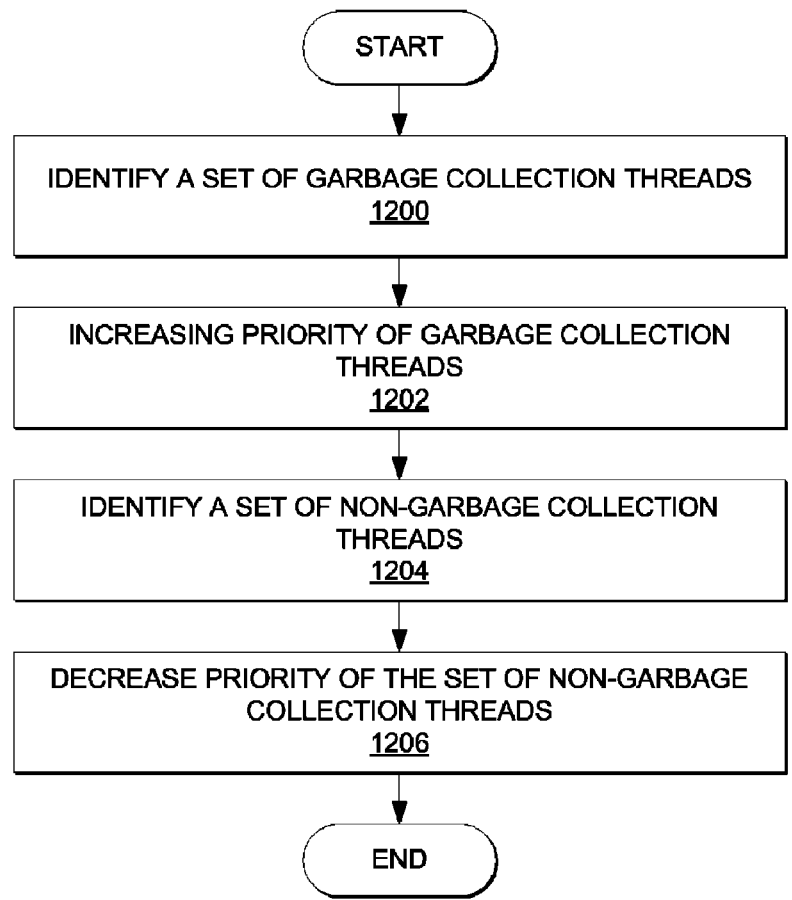
FIG. 5
FIG. 6
FIG. 12

CALL STACK SAMPLING FOR A MULTI-PROCESSOR SYSTEM

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer program code for call stack sampling in a multi-processor data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may use various techniques to provide information, such as execution flows, as well as other aspects of an executing program. A trace may contain data about the execution of code. For example, a trace may contain trace records about events generated during the execution of the code. A trace also may include information, such as a process identifier, a thread identifier, and a program counter. Information in the trace may vary depending on the particular profile or analysis that is to be performed. A record is a unit of information relating to an event that is detected during the execution of the code.

In obtaining trace data, it is a common practice to obtain information about executing threads. This information may include call stack information obtained from call stacks associated with the threads of interest. Call stack information may be obtained from a virtual machine, such as a Java™ virtual machine. Java™ is a trademark of Sun Microsystems, Inc. Many approaches are presently used for obtaining call stack information. These approaches include using entry/exit events, an application timer tick, or instrumenting codes that sample the instrumented values.

BRIEF SUMMARY OF THE INVENTION

The illustrative embodiments provide a computer implemented method for sampling call stack information. Responsive to identifying a set of interrupts, a determination is made as to whether all processors in a plurality of processors have generated the set of interrupts. A number of addresses for the interrupt is identified to form a set of identified addresses in response to a determination that all of the processors have generated the set of interrupts. A determination is made as to whether the set of identified addresses falls within a set of address ranges. Responsive to a determination that any address within the set of identified addresses falls within the set of address ranges, a sampler thread is notified to obtain the call stack information.

BRIEF DESCRIPTION OF THE SEVERAL VIEWS OF THE DRAWINGS

FIG. 5 is a diagram of a tree in accordance with an illustrative embodiment;

FIG. 6 is a diagram illustrating information in a node in accordance with an illustrative embodiment;

FIG. 12 is a flowchart of a process that may be initiated for other processing in accordance with an illustrative embodiment;

DETAILED DESCRIPTION OF THE INVENTION

Figure 1:
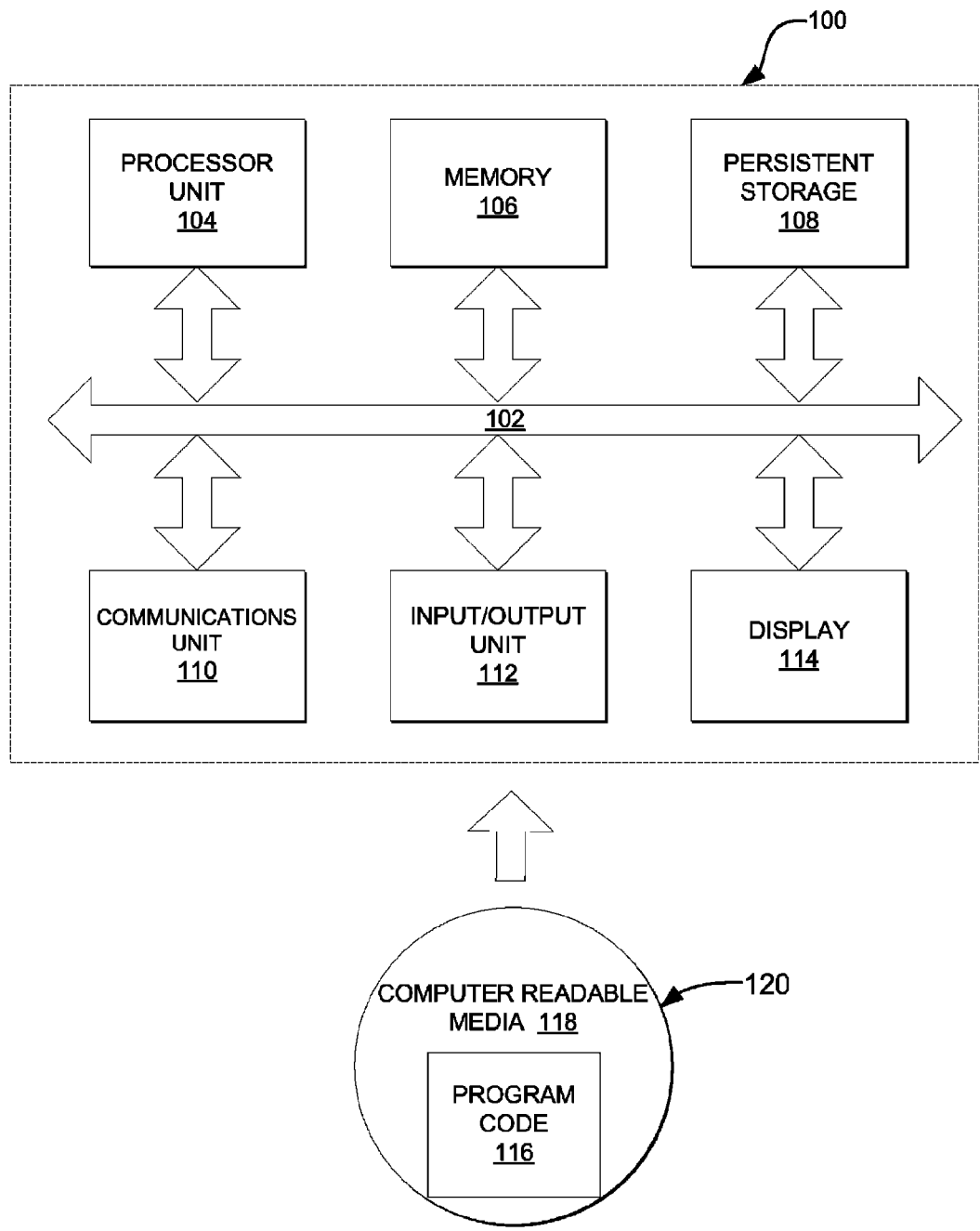
FIG. 1 is a diagram of a data processing system in which an illustrative embodiment may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
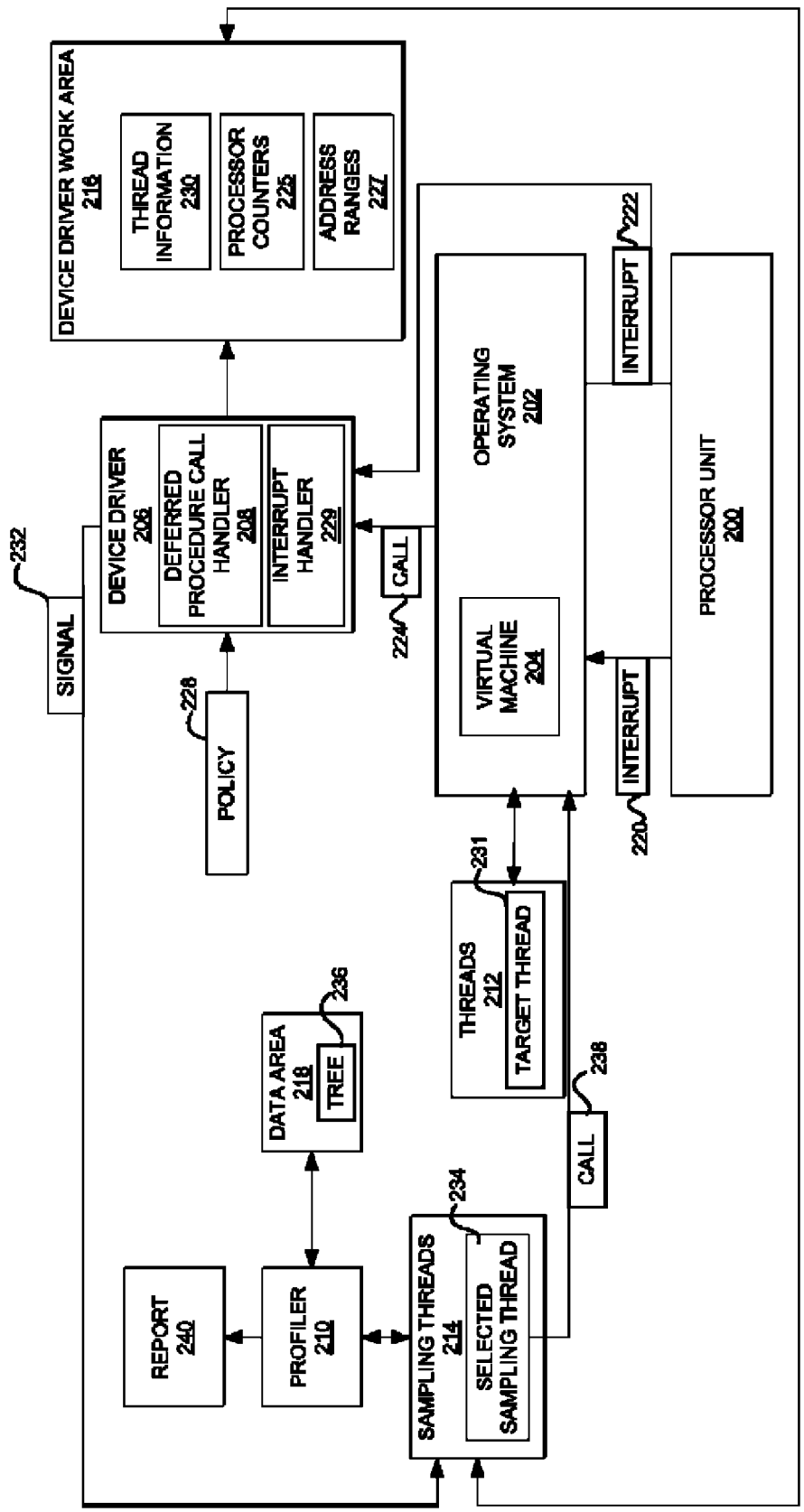
FIG. 2 is a diagram illustrating components used to obtain call stack information in accordance with an illustrative embodiment.

With reference to FIG. 2, a diagram illustrating components used to obtain call stack information is depicted in accordance with the illustrated embodiment. In the depicted example, the components are examples of hardware and software components found in the data processing system, such as data processing system 100 in FIG. 1.

These components include processor unit 200, operating system 202, virtual machine 204, device driver 206, deferred procedure call handler 208, profiler 210, threads 212, sampling threads 214, device driver work area 216, and data area 218.

Processor unit 200 is similar to processor unit 104 in FIG. 1 and may generate interrupts, such as interrupts 220 and 222 from processors within processor unit 200. These interrupts may be, for example, without limitation, timer interrupts.

In particular, interrupt 220 and interrupt 222 may be generated based on timed interrupts that may be initiated for all of the processors within processor unit 200. In these examples, this type of interrupt may be generated using an advanced programmable interrupt controller within each processor and processor unit 200.

The interrupts may be passed to device driver 206 in a number of different ways. For example, interrupt 220 is passed to device driver 206 through call 224. Alternatively, interrupt 222 is passed directly to device driver 206 via an Interrupt Vector Table (IVT). After receiving an interrupt, device driver 206 may process the interrupt using a deferred procedure call (DPC) to deferred procedure call handler 208 located within device driver 206. Of course, other routines or processes may be used to process these interrupts. The deferred procedure call initiated by device driver 206 is used to continue processing interrupt information from interrupt 222.

In another embodiment, a dispatcher in operating system 202 may record the process and thread information of the dispatched process in a per processor work area and this information may be used to determine the threads for which call stacks are obtained. In this embodiment, deferred procedure call handlers may be initiated on all processors by one specific processor interrupt handler. Alternatively, one processor may be identified to process the interrupt and interprocessor interrupt (IPI) may be used for interrupting the other processors.

In yet another embodiment, the interrupt handlers may determine if all processors are synchronized to be processing an interrupt by simply looping until it is determined that all the processors have entered the interrupt state. Each interrupt provides information that may be used by the interrupt handler to identify an instruction address for a thread that has been interrupted as identified using the saved interrupt state. When the interrupted instruction is a load or a store instruction, the data address may be determined by interrupt handler by examining the saved interrupt state. The address of the interrupted instruction and if available the data address for the interrupted instruction is saved when the interrupt occurs and can be used to identify set the address for the interrupted thread. In this manner a set of addresses for a set interrupted threads can be identified.

In the different illustrative embodiments, deferred procedure call handler 208 determines whether all of the processors with processor unit 200 have generated an interrupt in response to device driver 206 receiving interrupt 222 or call 224. Deferred procedure call handler 208 may update a counter within processor counters 225 in device driver work area 216. Each processor counter within processor counters 225 may be associated with a particular processor in processor unit 200. Processor counters 225 also may be referred to as flags. One implementation may involve atomically ORing a bit in a word identifying the processor currently being interrupted and comparing the word to the active processor set.

More specifically, deferred procedure call handler 208 determines whether the interrupt received from the processor has a counter set in processor counts 225. If the counter is not set for the processor, deferred procedure call handler 208 sets that counter. Next, deferred procedure call handler 208 determines whether all of processor counters 225 have been set. If all of processor counters 225 have not been set, deferred procedure call handler 208 loops until all the processors have taken an interrupt or a determination has been made that there is a problem. If a problem is a detected, for example, by determining that the elapsed time has exceeded a threshold, then either the process is terminated or an attempt is made to reset the interrupt processing.

By looping, deferred procedure call handler 208 places that processor into a state in which the processor does not execute instructions for an application. In addition, deferred procedure call handler 208 may also initiate high priority sampler threads on each processor reducing the amount of forward progress made by the monitored application. These sampler threads may be retrieving call stacks or may run in a "spin loop" until execution of that thread is terminated. As a result, the forward progress of the application is eliminated or reduced. In some cases, the application must progress to a state in which the call stack may be retrieved.

If interrupts have been received from all of the processors within processor unit 200, deferred procedure call handler 208 may then determine whether call stack information should be obtained. This determination may be made using policy 228. Policy 228 may be a set of rules identifying what actions to take. For example, policy 228 may specify that call stacks will be obtained only if a virtual machine 204 is interrupted or if there is no sampling in process. Determination of sampling in process may be made by verifying that the interrupt is not in a sampling thread and all of sampling threads 214 are blocked and waiting for work. As another example, policy 228 may specify that call stack information should not be obtained if the interrupt occurs when a sampling thread is executing on a processor. In either event, the fact that a sampling process is occurring or that a sampling thread was encountered when an interrupt occurred may be identified for later processing. For example, the occurrence of one of these two conditions may be identified by incrementing a counter for the particular condition. In yet another example, policy 228 may specify a set of ranges as ones of interest for call stack sampling. If interrupt 222 indicates that an address identified by interrupt 222 falls within a set of address ranges, such as address ranges 227, call stack sampling may be initiated. In these examples, an address range may be one or more addresses. A set as used herein refers to one or more items. For example, a set of address ranges is one or more address ranges. Address ranges 227 may be for a particular process, application, subroutine, or some other unit of code that may be executed by processor unit 200. In other illustrative embodiments, the set of address ranges may be for data objects that may be accessed during execution.

These address ranges may be identified by receiving an identification for a set of executable code in a user input. This executable code may be for example, a process, a thread, a routine, a function, or some other type of executable code. This identification may be, for example, a method name or function name. The identification is converted to a set of addresses for the set executable code to form the set of address ranges. In some cases, the address range within the set of address ranges may change during execution. When this occurs, a new address range is identified In one illustrative example, a user may identify a method to be monitored, the profiler keeps track of JITed methods and their loaded addresses by JVMPI or JVMTI events and passes the information to the driver.

In these examples, the interrupt handler 229 may identify the address interrupted or the data address being accessed at the time of interrupt 222. For example, a user may identify a set of routines of interest. Profiler 210 may identify the address ranges for a set of routines by obtaining loaded module information or by monitoring addresses of JITed methods to form address ranges 227. Profiler 210 passes address ranges 227 to device driver 206, which places address ranges 227 into device driver work area 216. In a similar manner, a user may specify a specific object class or object instance meeting specific criteria or a data area referenced by a lock or monitor using profiler 210. Profiler 210 may obtain the data information area from virtual machine 204 and pass this information to device driver 206. In turn, device driver 206 places this information into device driver work area 216 as address ranges 227. In this manner, the interrupt handler may compare the identified address with the set of address ranges stored in device driver work area 216.

If deferred procedure call handler 208 decides that call stack information should be sampled using one rule and policy 228, another rule may initiate other processing other than call stack sampling. For example, policy 228 may specify that other processing should occur instead of call stack sampling if a set of particular conditions are present within the data processing system environment. For example, policy 228 may specify that call stack information should not be obtained if garbage collection is occurring within the data processing system. With this condition being present in the data processing system, policy 228 may specify that other types of processing should occur.

For example, the other type of processing may be to perform no other actions, change a state of the garbage collection threads, or perform some other action. In another example, call stack sampling may not occur even though the address identified for interrupt 222 is within a set of address ranges as if call stack sampling is already being performed. In one embodiment, detection that virtual machine 204 is currently performing garbage collection and a determination that virtual machine 204 was interrupted, may simply be the increment of a counter for each virtual machine thread interrupted.

Similarly, if it is detected that an interrupted processor was idle, a counter may be incremented indicating the count of idle processors interrupted. If the interrupted process was not the virtual machine of interest, then a non-virtual machine counter may also be incremented. These summary counts may be reported as part of the profiling reports, which may include an accounting of all processed ticks. In the summary reports, there may be summaries counts for non-idle processes interrupted, idle processors, samples not taken because sampling still in process, samples during garbage collection, samples not taken because the criteria such as not find the sample in the specified sampling address range criteria. In some embodiments, this determination and counting may be performed on the interrupt level and avoiding the need to queue a deferred procedure call.

If device driver 206 determines that call stack information should be obtained through processing of the interrupt by deferred procedure call handler 208, initiation of call stack sampling information may be made for a thread such as, for example, target thread 231 and threads 212. Device driver 206 may send signal 232 to sampling threads 214. Signal 232 may wake selected sampling thread 234 to obtain call stack information.

Selected sampling thread 234 may obtain information from thread information 230 in device driver work area 216 and place the information into data area 218. Selecting sampling thread 234 may access device driver work area 216 through a pointer passed to the sampling thread in signal 232 by device drive 206.

This information may be placed into tree 236 for later analysis. Further, selected sampling thread 234 also may send call 238 to virtual machine 204 to obtain call stack information. Virtual machine 204 may be, for example, a Java™ virtual machine. Of course, virtual machine 204 may take the form of any other type of virtual machine, depending on the particular implementation.

Selected sampling thread 234 takes the call stack information obtained from virtual machine 204 and places this information into tree 236 for analysis. Additionally, tree 236 contains call stack information and other information, such as, number of samples. Tree 236 also may include information about each leaf node, which was the last routine being executed on that thread at the time the call stack was retrieved. After call stack information has been collected, profiler 210 may generate report 240. Report 240 is a presentation of information stored within tree 236 in data area 218.

Figure 3:
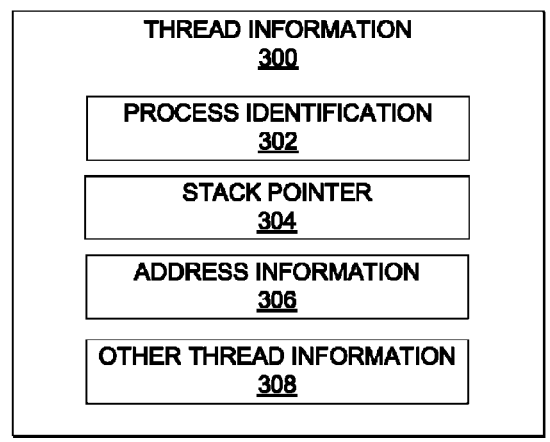
FIG. 3 is diagram illustrating thread information and a device driver work area in accordance with an illustrative embodiment.

With reference now to FIG. 3, a diagram illustrating thread information and a device driver work area is depicted in accordance with an illustrative embodiment. In this example, thread information 300 is a more detailed example of thread information 230 in FIG. 2. As illustrated, thread information 300 includes process identification 302, stack pointer 304, address information 306, and other thread information 308. This thread information may be used to obtain call stack information for a particular thread. Further, this information may be used by deferred procedure call handler 208 along with policy 228 to determine whether call stack information should be obtained.

Also, this information may be used to identify a particular target thread for which call stack information may be obtained. As one illustrative example, address information 306 may be compared to a set of address ranges such as address range 227 in FIG. 2 to determine whether address information 306 falls within any of those address ranges. Address information 306 may include, for example, an identification of an address for code being executed or identification of an address of data being accessed.

Figure 4:
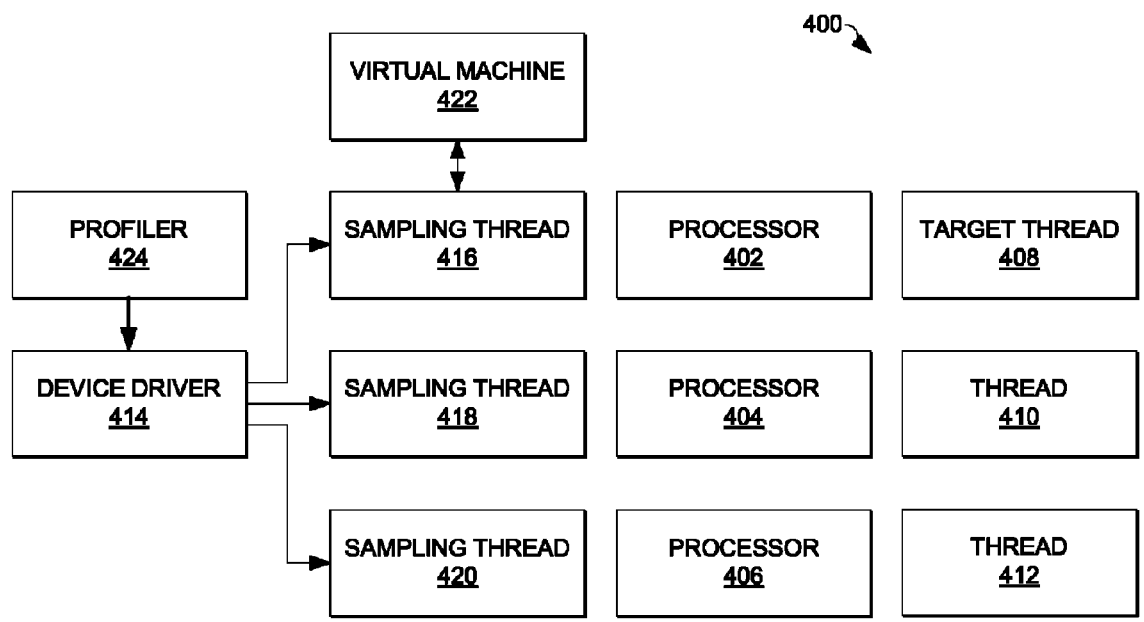
FIG. 4 is a diagram illustrating components to obtain call stack information in accordance with an illustrative embodiment.

Turning now to FIG. 4, a diagram illustrating components to obtain call stack information is depicted in accordance with an illustrative embodiment. In this example, data processing system 400 includes processors 402, 404, and 406. These processors are examples of processors that may be found in processor unit 200 in FIG. 2. During execution, each of these processors has threads executing on them in the depicted examples. In other examples, one or more processors may be in an idle state in which no threads are executing on these processors.

When an interrupt occurs, target thread 408 is executing on processor 402; thread 410 is executing on processor 404; and thread 412 is executing on processor 406. In these examples, target thread 408 is the thread interrupted on processor 402. For example, the execution of target thread 408 may be interrupted by a timer interrupt or hardware counter overflow, where the value of the counter is set to overflow after a specified number of events, for example, after 100,000 instructions are completed.

When an interrupt is generated, device driver 414 determines whether to send a signal to a selected sampling thread in sampling threads 416, 418, and 420. In these examples, device driver 414 determines whether all of the processors have generated interrupts. If all of processors 402, 404, and 406 have generated interrupts, device driver 414 may then determine whether to obtain call stack information using a policy as described above.

Each of these sampling threads is associated with one of the processors. In this example, sampling thread 418 is associated with processor 404, sampling thread 420 is associated with processor 406, and sampling thread 416 is associated with processor 402.

One of these sampling threads is woken by device driver 414 when the sampling criteria is met. In these examples, device driver 414 is similar to device driver 206 in FIG. 2. In this example, target thread 408 is the thread of interest for which call stack information is desired.

In the depicted examples, device driver 414 sends a signal to one or more of sampling threads 416, 418, and 420 to obtain call stack information. In this example, sampling thread 416 is woken by device driver 414 to obtain call stack information for target thread 408.

The call stack information may be obtained by making appropriate calls to virtual machine 422. In these examples, virtual machine 422 is a Java™ virtual machine. In these examples, the interface used to make calls is the Java™ Virtual Machine Tools Interface (JVMTI). This interface allows for the collection of call stack information. The call stacks may be, for example, used to create standard trees containing count usage for different threads or methods. The Java™ Virtual Machine Tool interface is an interface that is available in Java™ 5 software development kit (SDK), version 1.5.0.

The Java™ Virtual Machine Profiler Interface (JVMPI) is available in Java™ 2 platform, standard edition (J2SE) SDK version 1.4.2. These two interfaces allow processes or threads to obtain information from the Java™ virtual machine. Descriptions of these interfaces are available from Sun Microsystems, Inc. Either interface, or any other interface to a Java™ virtual machine, may be used to obtain call stack information for one or more threads in this particular example. Call stack information obtained by sampling thread 416 is provided to profiler 424 for processing. A call tree is constructed from the call stack obtained from virtual machine 422 at the time of a sample. The call tree may be constructed by monitoring method/functions entries and exits. In these examples, however, tree 500 in FIG. 5 is generated using samples obtained by a sampling thread, such as sampling thread 416 in FIG. 4.

Turning to FIG. 5, a diagram of a tree is depicted in accordance with an illustrative embodiment. Tree 500 is a call tree and is an example of tree 236 in FIG. 2. Tree 500 is accessed and modified by an application, such as profiler 210 in FIG. 2. In this depicted example, tree 500 contains nodes 502, 504, 506, and 508. Node 502 represents an entry into method A, node 504 represents an entry into method B, and nodes 506 and 508 represent entries into method C and D, respectively. Each of these nodes may include call stack information as well as sample counts associated with a particular thread for a method.

With reference now to FIG. 6, a diagram illustrating information in a node is depicted in accordance with an illustrative embodiment. Entry 600 is an example of information in a node, such as node 502 in FIG. 5. In this example, entry 600 contains method/function identifier 602, tree level (LV) 604, and sample count 606.

The information within entry 600 is example information that may be determined for a node within a tree. For example, method/function identifier 602 contains the name of the method or function. Tree level (LV) 604 identifies the tree level of the particular node within the tree. For example, with reference back to FIG. 5, if entry 600 is for node 502 in FIG. 5, tree level (LV) 604 would indicate that this node is a root node. Sample count 606 may include accumulated counts for a node on a thread.

When the profiler is signaled, the profiler may request that a call stack be retrieved for each thread of interest. Each call stack that is retrieved is walked into a call stack tree and each sample or changes to metrics that are provided by the device driver are added to the leaf node's base metrics, which may be the count of samples of occurrences for a specific call stack sequences. In other embodiments, the call stack sequences may simply be recorded.

Figure 7:
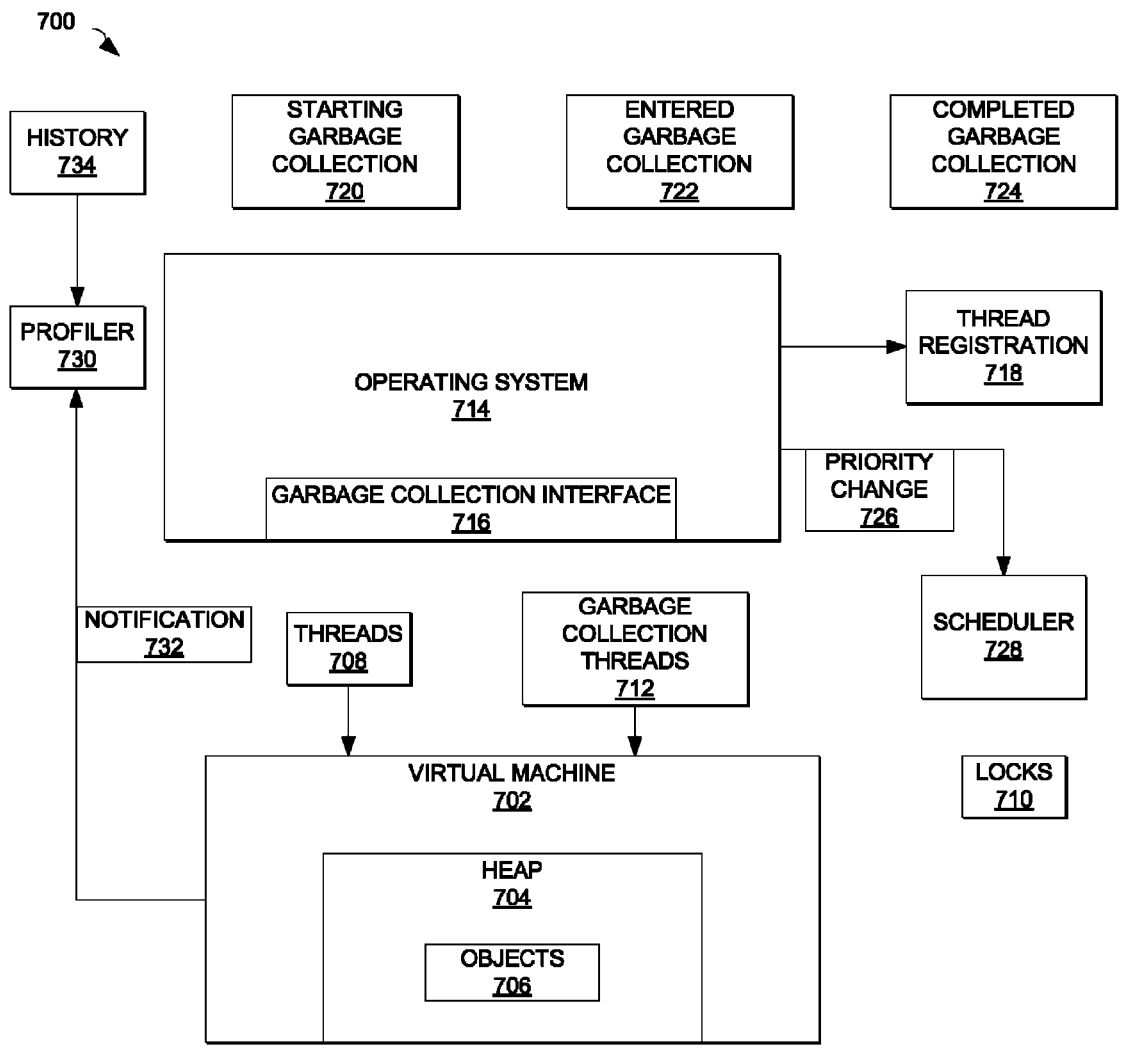
FIG. 7 is a diagram of components used in garbage collection in accordance with an advantageous embodiment.

With reference now to FIG. 7, a diagram of components used in garbage collection is depicted in accordance with an advantageous embodiment. In this example, garbage collection environment 700 is an example of an environment in which other processing may occur when a condition occurs in which garbage collection state is present. In this example, virtual machine 702 includes heap 704. Heap 704 contains objects 706. These objects may be allocated during the execution of threads 708. Threads 708 may access objects 706. When a thread within threads 708 accesses an object within objects 706, a lock is obtained for that object from locks 710. This lock prevents other threads from accessing the same object. Once the thread releases the lock for the object, then that object may be accessed by another thread.

When automatic garbage collection is supported, any threads within threads 708 that need to allocate objects must release their locks and wait for garbage collection threads 712 to acquire and release locks from locks 710.

During the phase of acquiring ownership of locks 710 by garbage collection threads 712, it is advantageous for any of threads 708 currently owning at the lock within locks 710 to complete processing as quickly as possible to allow garbage collection threads 712 to acquire locks 710 and begin processing of heap 704. Once garbage collection threads 712 own locks 710, it is advantageous to allow garbage collection threads 710 to execute as fast as possible without interference from threads 708. It is also desirable for threads 708 to stay inactive until garbage collection is completed by garbage collection threads 712.

Some of this type of processing is performed automatically by operating system 714 as a part of normal lock handling processing. The length of time required to perform garbage collection, however, may be longer and require more resources than other types of processing handled by other uses of locks 710. For example, traversing heap 704 accesses more virtual storage. This situation is true for large multi-gigabyte heaps. As a result, the illustrative embodiments recognize that effective garbage collection by garbage collection threads 712 may be improved through specialized handling.

In these different examples, operation system 714 has garbage collection interface 716. In this example, this garbage collection interface may support registering garbage collection threads in thread registration 718. As a result, when a garbage collection thread within garbage collection threads 712 obtains a lock from locks 710, the registration 718 may be used to identify the lock as a garbage collection lock. In other words, a garbage collection thread registered in registration 718 may be identified when that thread obtains a lock from locks 710.

With this information, operating system process 714 may identify a number of different phases for a garbage collection state. In these examples, these phases include starting garbage collection 720, entered garbage collection 722, and completed garbage collection 724. Starting garbage collection 720 may be identified when a garbage collection thread within garbage collection threads 712 obtains a lock from lock 710. Entered garbage collection 722 occurs when all of threads 708 have released any locks from locks 710. Completed garbage collection 724 occurs when garbage collection threads 712 release all of locks 710.

In these examples, when operating system 714 detects starting garbage collection 720, operating system process 714 may change the priority of garbage collection threads 712. In particular, the priority of garbage collection threads 712 may be increased. This priority may be increased until any locks obtained by garbage collection threads 712 are released. Once entered garbage collection 722 has occurred, or a lock has been released by a thread within threads 708, the priority of threads 708 may be reduced. In this manner, threads 708 do not contend with garbage collection threads 712 for processor resources. The priorities may be restored after the garbage collection state ends.

In these depicted examples, operating system 714 may change the priority of threads 708 and garbage collection threads 712 by sending priority change 726 to scheduler 728. Scheduler 728 schedules the execution of threads such as threads 708 and garbage collection threads 712.

Additionally, operation system 714 also may perform other operations such as, for example, paging out non-garbage collection threads and paging in garbage collection threads and including expected data area accesses in this paging process.

In an alternative embodiment, the support for garbage collection processing may be performed using profiler 730. Virtual machine 702 may send notification 732 to profiler 730 when a garbage collection state occurs. In this example, virtual machine 702 is used to identify when a garbage collection process occurs as opposed to using operating system 714 as described above. When profiler 730 receives notification 732, profiler 730 may use garbage collection interface 716 to change the priority for garbage collection threads 712. In other examples, profiler 730 may use data collected during previous garbage collection processing to adjust thread priorities and to touch data areas to preload processor caches with heap data.

In these examples, the steps performed by operating system 714 to perform actions to increase the performance of garbage collection may be performed using an operating system process, such as, for example, a device driver or other operating system process within operating system 714.

With this type of embodiment, profiler 730 may notify a device driver such as, for example, device driver 206 in FIG. 2, to obtain thread identification information when garbage collection occurs. This information, collected using the process described in FIG. 2, may be used to obtain an identification of threads that are active during garbage collection as well as the data areas that are active during garbage collection. In this manner, previously collected information may be used to adjust thread priorities and pre-fetch data in heap data areas. In particular, the priorities for threads 712 may be decreased while the priorities for garbage collection threads 712 may be increased while a garbage collection state is present. This thread information may be stored in history 734 for use by profiler 730.

Figure 8:
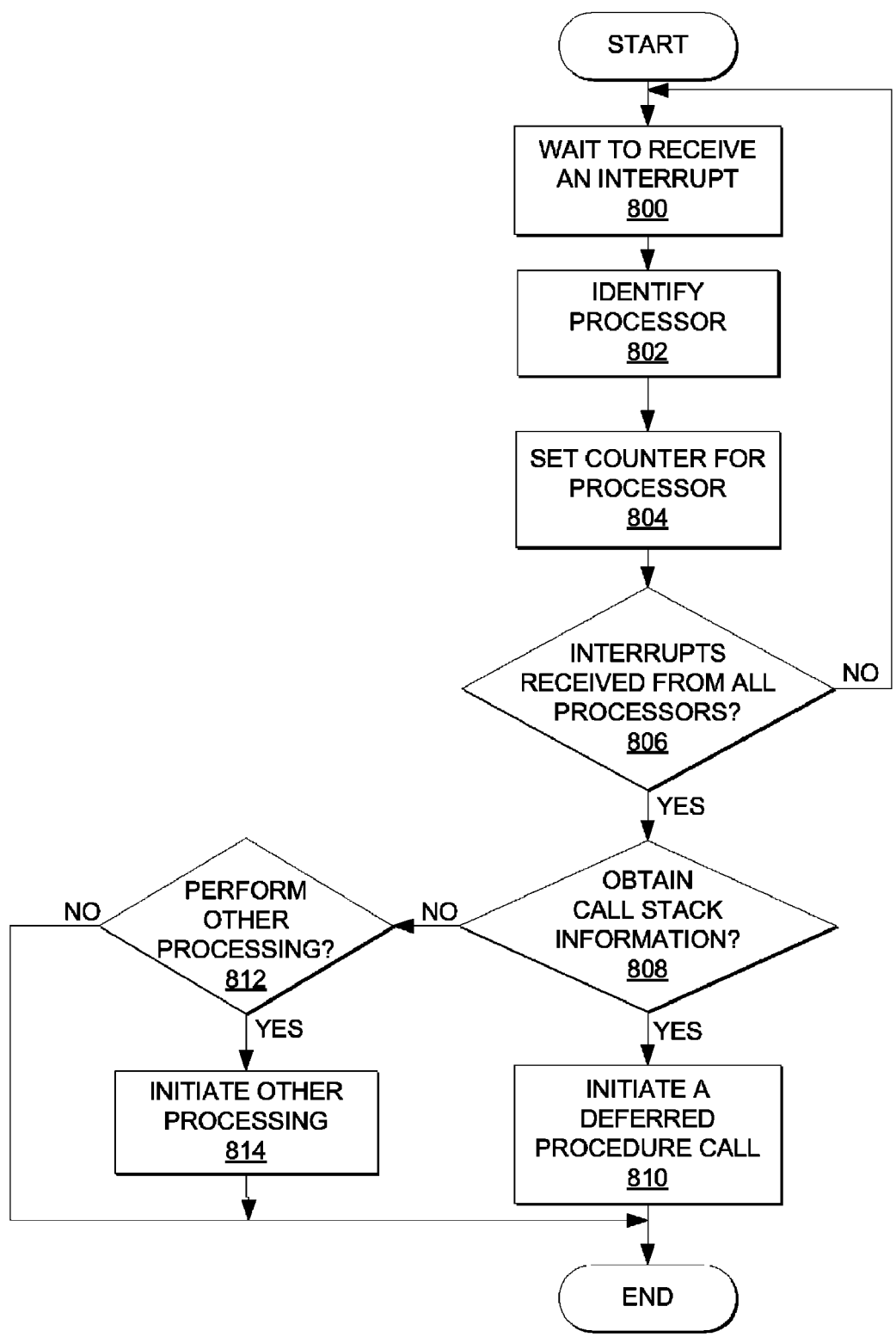
FIG. 8 is a flowchart of a process for processing interrupts in accordance with an illustrative embodiment.

With reference now to FIG. 8, a flowchart of a process for processing interrupts is depicted in accordance with an illustrative embodiment. In this example, process 800 may be implemented in such a component, such as, for example, deferred procedure call handler 208 in FIG. 2.

The process begins by receiving an interrupt (step 800). This interrupt may be received directly from the processor or through the operating system depending on the particular implementation. The process then identifies the processor generating the interrupt (step 802). Thereafter, the process sets a counter for the processor (step 804). The looping through steps 800, 802, 804, and 806 prevent the forward progress.

A determination is then made as to whether interrupts have been received from all of the processors (step 806). This determination may be made by checking the different counters to see whether all of the counters have been set for the different processors. If interrupts have not been received from all the processors, the process returns to step 800 to wait to receive another interrupt. If interrupts have been received from all of the processors, a determination is made as to whether to obtain call stack information (step 808). The determination may be made using a policy such as policy 228 in FIG. 2.

If call stack information is to be obtained, the process initiates a deferred procedure call for each processor (step 810) with the process terminating thereafter. This deferred procedure call is used by the device driver to prevent forward progress in execution and to initiate call stack sampling. For example, the events may be a signal sent to a sampling thread such as signal 232 in FIG. 2.

With reference again to step 808, if call stack information is not to be obtained, a determination is made as to whether other processing is to be performed (step 812). Step 812 may be made by determining whether selected conditions are present within the operating system. For example, if a condition is present in which garbage collection is occurring, then other processing may be performed. If other processing is to be performed, this other processing is initiated (step 814) with the process terminating thereafter. This step may include various actions. These actions may include, for example, increasing the priority of garbage collection threads if garbage collection is occurring within the operating system. As another example, no action may be performed as the other processing if a call stack sampling condition is present with call stack sampling already occurring. In this case, it may be undesirable to obtain call stack information on the threads performing call stack sampling.

With reference again to step 812, if other processing is not to be performed, the process terminates. In these examples, call stack information may not be obtained for a number of different reasons, depending on the policy used.

Figure 9:
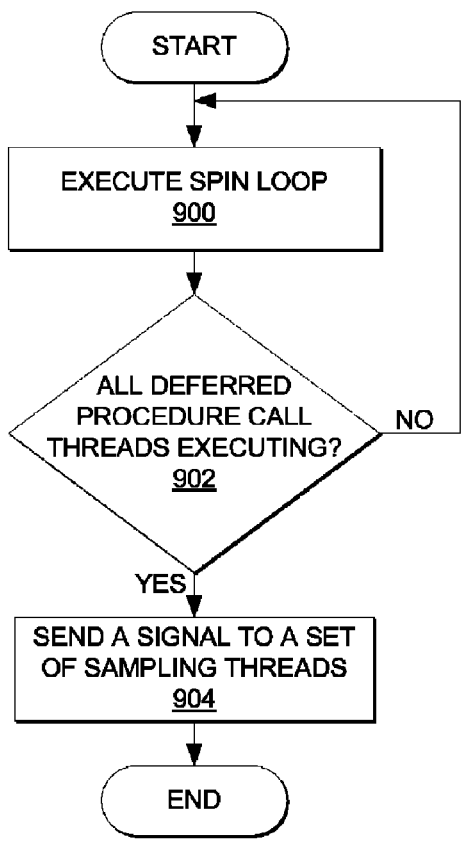
FIG. 9 is a flowchart of a deferred procedure call in accordance with an illustrative embodiment.

Turning next to FIG. 9, a flowchart of a deferred procedure call is depicted in accordance with an illustrative embodiment. In these examples, the process in FIG. 9 is an example of a process that may be executed by a deferred procedure call in accordance with an illustrative embodiment.

The process begins by executing a spin loop (step 900). In this step, the deferred procedure call thread executes on the processor at a priority that is higher than the sampling threads at a priority that is lower than an interrupt. The spin loop may be a loop that occurs until the deferred procedure call thread is to be terminated. In this manner, the deferred procedure call thread may keep the processor busy to prevent any forward progress in the execution of an application.

The process then determines whether all of the deferred procedure call threads are executing (step 902). This determination may be made by accessing a work area in which the deferred procedure call handler threads may register. This work area may be, for example, device driver work area 216 or some other work area that may be provided through the operating system. If all of the deferred procedure call threads are not executing, the process returns to step 900.

Otherwise, a signal is sent to a set of sampling threads (step 904) with the process terminating thereafter. In these examples, step 904 may be performed by only one of the deferred procedure call threads. This deferred procedure call thread may obtain ownership of sampling and send a signal to the set of sampling threads to initiate collection of call stack information. In other embodiments, each deferred procedure call thread may send a signal to an associated sampling thread.

Figure 10:
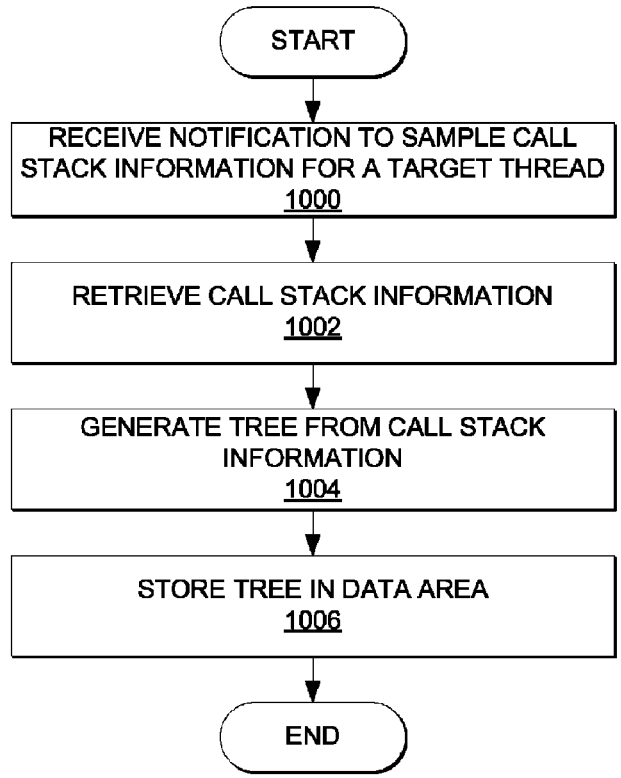
FIG. 10 is a flowchart of a process for collecting call stack information in accordance with an illustrative embodiment.

With reference now to FIG. 10, a flowchart of a process for collecting call stack information is depicted in accordance with an illustrative embodiment. In this example, the process may be implemented in a software component such as a virtual machine.

The process begins by receiving a notification to sample call stack information for a target thread (step 1000). The call stack information is then retrieved (step 1002). Next, a tree is generated from the call stack information (step 904). In this example, the tree may be tree 500 in FIG. 5. This tree is stored in a data area (step 1006) with the process terminating thereafter. In these examples, this data area may be data area 218 in FIG. 2. Some sampler threads may simply loop while other sampler threads are getting call stacks. The looping terminates when all the call stacks from the other sampling threads have been retrieved and/or processed.

Figure 11:
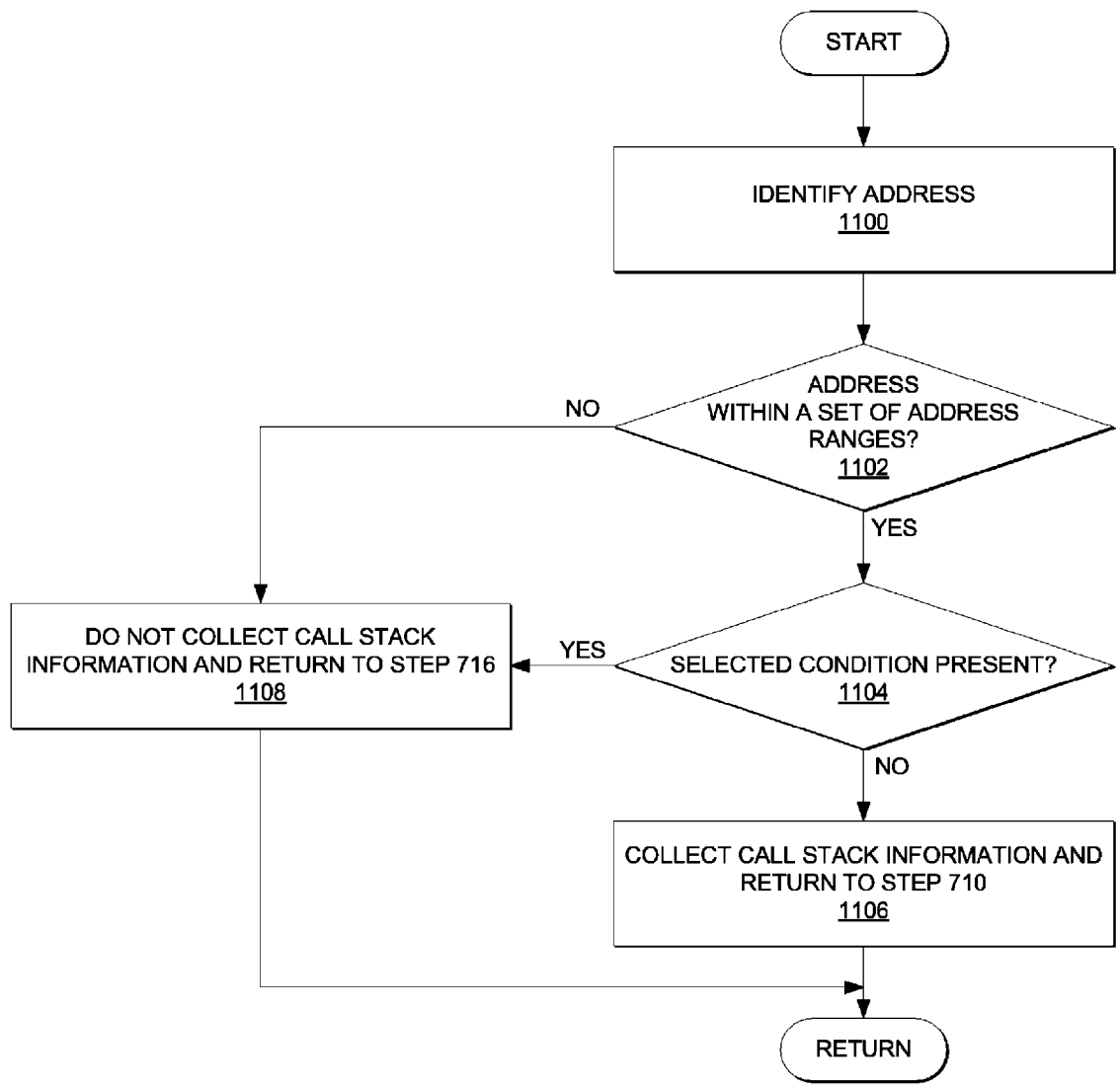
FIG. 11 is a flowchart of a process for determining whether to obtain call stack information in accordance with an advantageous embodiment.

With reference now to FIG. 11, a flowchart of a process for determining whether to obtain call stack information is depicted in accordance with an advantageous embodiment. The process illustrated in FIG. 11 is a more detailed illustration of one implementation of step 808 in FIG. 8.

The process begins by identifying an address (step 1100). This address is the address for the interrupt that has been generated. The address may be identified using an interrupt handler. The process determines whether the address is within a set of address ranges (step 1102). These address ranges may be address ranges 227 located within a work area such as, for example, device driver work area 216 in FIG. 2. The set of address ranges may be specified by user input. For example, user may identify routines or data objects of interest. Addresses for these routines or data objects may be identified by a profiler and stored in the work area.

If the address is within the set of address ranges, the process determines whether a selected condition is present in the operating system (step 1104). This determination may be used to decide whether call stack information should be obtained or samples even though the address is within the set of address ranges. In these examples, some conditions may be present in which call stack sampling is not desired. For example, if a condition in which garbage collection is occurring, it may be undesirable to obtain call stack information. Another illustrative example is if call stack sampling is already occurring, then sampling call stack information for the threads that are performing the call stack sampling may not be desirable.

If the selected condition is not present, the process determines that call stack information should be collected. This identification results in the process then proceeding to step 810 as described in FIG. 7 (step 1106). The process then returns to the identified step in FIG. 8.

With reference again to step 1102, if the address is not within the set of address ranges, the process determines that call stack information should not be collected and determines that the process should return to step 816 (step 1108). The process then returns to the identified step in FIG. 8.

With reference now to FIG. 12, a flowchart of a process that may be initiated for other processing when garbage collection is occurring is depicted in accordance with an illustrative embodiment. The process illustrated in FIG. 12 may be implemented in an operating system, such as, for example, operation system 714 in FIG. 7.

The process begins by identifying a set of garbage collection threads (step 1200). Thereafter, the priority of the garbage collection threads are increased (step 1202). The process then identifies a set of non-garbage collection threads (step 1204). The priority of the set of non-garbage collection threads are decreased (Step 1206), with the process terminating thereafter.

The changing of the priority of threads in these examples may be performed by requesting thread priority changes via operating system interfaces. Of course, various other actions may be performed depending on the condition identified within the operating system. The examples of different conditions and actions that may be initiated are provided for purposes of illustration and not meant to limit the conditions or actions that may be taken. The different illustrative embodiments may monitor for other conditions and perform other actions depending upon the rules within the policy.

Figure 13:
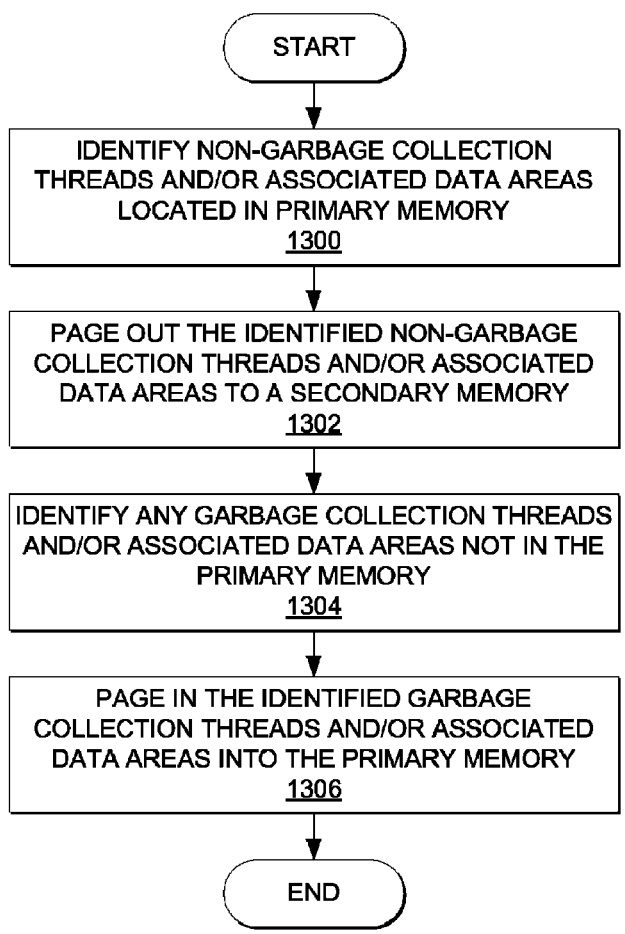
FIG. 13 is a flowchart of a process for increasing garbage collection performance in accordance with an illustrative embodiment.

With reference now to FIG. 13, a flowchart of a process for increasing garbage collection performance is depicted in accordance with an illustrative embodiment. The process illustrated in FIG. 13 may be performed by an operating system such as operating system 714 in FIG. 7. This process may be initiated when a garbage collection condition is detected.

The process begins by identifying non-garbage collection threads and/or associated data areas located in primary memory (step 1300). In these examples, the primary memory is a random access memory. The process then pages out the identified non-garbage collection threads and/or associated data areas to a secondary memory (step 1302). This secondary memory may be, for example, a hard disk.

The process then identifies any garbage collection threads and/or associated data areas that are not the primary memory (step 1304). The associated data areas may be ones that are expected to be used or touched by the garbage collection threads. The process then pages in the identified garbage collection threads and/or associated data areas into primary memory from the secondary memory (step 1306) with the process terminating thereafter.

In this manner, the performance of garbage collection may be improved. This performance may be improved through the placement of garbage collection threads and data areas into the primary memory rather than having those threads being accessed from a secondary memory. In these examples, an operating system may perform other processing such as, for example, the steps described above, to enhance garbage collection processes.

Figure 14:
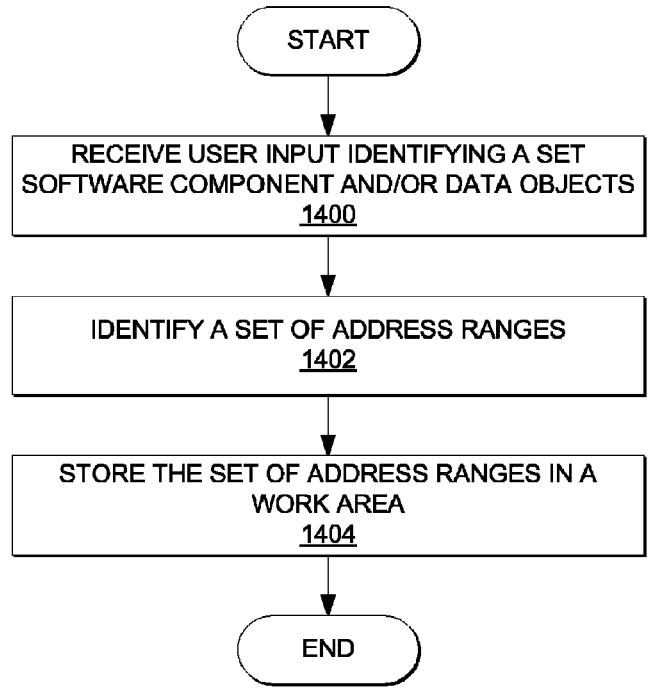
FIG. 14 is a flowchart of a process for selecting address ranges in accordance with an illustrative embodiment.

With reference now to FIG. 14, a flowchart of a process for selecting address ranges is depicted in accordance with an illustrative embodiment. The process illustrated in FIG. 14 may be performed within a software component such as profiler 210 in FIG. 2.

The process begins by receiving user input identifying a set of software components and/or data objects (step 1400). The process then identifies a set of address ranges from user input (step 1402). Next, a set of address ranges are stored in a work area (step 1404) with the process terminating thereafter. In these examples, the work area may be, for example, device driver work area 216 in FIG. 2.

The different illustrative embodiments may provide a computer implemented method, apparatus, and computer usable program code for sampling call stack information. In response to identifying the interrupt, an address for the interrupt is identified. A determination is made as to whether the identified address falls within a set of address ranges. In response to the determination that the identified address falls within the set of address ranges, call stack information is sampled.

Further, the different advantageous embodiments also provide a computer implemented method, apparatus and computer useable program code for processing interrupts. In response to identifying an interrupt, a determination is made as to whether a selected condition is present in an operating system. If the selected condition is present, a determination is made as to whether processing other than call stack sampling should be performed.

Thus, the different advantageous embodiments provide a capability to perform for selective and/or more granular call stack sampling through the use of address ranges to identify executable code and/or data objects. Further, the different illustrative embodiments also provide a capability to avoid call stack sampling when other conditions are present. In addition, other processing to enhance or process those conditions may be initiated.

Thus, the different illustrative embodiments provide a computer-implemented method, apparatus, and computer usable program code for sampling call stack information. In the different illustrative examples, a determination is made as to whether all processors in the plurality of processors have generated an interrupt when an interrupt is identified or received. If all of the processors have generated an interrupt, a determination is made as to whether call stack information should be sampled based on a policy. The call stack information is sampled if the determination is made to sample that call stack information using the policy.

The different illustrative embodiments provide a capability to selectively perform call stack sampling even if all of the processors have generated interrupts. Different types of processing other than call stack sampling may occur, depending on the various conditions or parameters. Of course, other types of criteria or rules may be used to determine whether to collect call stack information and what processing to perform in other implementations and these examples are not meant to limit the manner in which that type of processing and determination may be made.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sampling call stack information, the computer implemented method comprising:
responsive to identifying a set of interrupts, determining whether all processors in a plurality of processors have generated the set of interrupts, wherein each of the plurality of processors is a processor unit that has a counter set after generating an interrupt and a determination as to whether all processors in the plurality of processors have generated the set of interrupts is made by checking all counters in the plurality of processors to determine that all counters have been set;
responsive to a determination that all of the processors have generated the set of interrupts, receiving an identification for a set of executable code in a user input and converting the identification to a set of identified addresses for the set of executable code to form a set of address ranges;
determining whether any address within the set of identified addresses falls within the set of address ranges; and
responsive to a determination that the any address within the set of identified addresses falls within the set of address ranges, notifying a sampling thread to obtain the call stack information.

2. The computer implemented method of claim 1 further comprising:
receiving user input identifying at least one of the set of executable code and a set of data objects;
identifying the set of address ranges from the user input; and
storing the set of address ranges in a work area.

3. The computer implemented method of claim 2, wherein the receiving step comprises:
receiving the user input identifying at least one of the set of executable code and the set of data objects at a profiler.

4. The computer implemented method of claim 1 further comprising:
responsive to a change in an address range within the set of address ranges during execution of the set of executable code, identifying a new address range.

5. The computer implemented method of claim 1, wherein the determining step and the sampling step are performed by a deferred procedure call handler.

6. The computer implemented method of claim 1 further comprising:
responsive to a determination that at least one of the set of identified addresses does not fall in the set of address ranges, performing an action.

7. The computer implemented method of claim 6, wherein the action is at least one of incrementing a counter and notifying the sampling thread to sample the call stack information for each address within the set of identified addresses falling within the set of address ranges.

8. A computer comprising:
a bus;
a storage device connected to the bus, wherein program code is stored on the storage device; and
a processor unit connected to the bus, wherein the processor unit executes the program code to determine whether all processors in a plurality of processors have generated a set of interrupts in response to identifying the set of interrupts, wherein the processor unit has a counter set after generating an interrupt and a determination as to whether all processors in the plurality of processors have generated the set of interrupts is made by checking all counters in the plurality of processors to determine that all counters have been set; identify a number of addresses for a set of interrupted threads identified by the set of interrupts to form a set of identified addresses in response to a determination that all of the processors have generated the set of interrupts, receive an identification for a set of executable code in a user input and convert the identification to a set of identified addresses for the set of executable code to form a set of address ranges; determine whether any address within the set of identified addresses falls within set of address ranges; and notify a sampling thread to obtain the call stack information in response to a determination that any address within the set of identified addresses falls within the set of address ranges.

9. The computer of claim 8, wherein the processor unit further executes the program code to receive user input identifying at least one of the set of executable code and a set of data objects; identify the set of address ranges from the user input; and store the set of address ranges in a work area.

10. The computer of claim 9, wherein in executing the program code to receive the user input identifying at least one of the set of executable code and the set of data objects, the processor unit executes the program code to receive the user input identifying at least one of the set of executable code and the set of data objects at a profiler.

11. The computer of claim 8, wherein the processor unit further executes the program code to perform an action in response to a determination that at least one of the set of identified addresses does not fall in the set of address ranges.

12. The computer of claim 11, wherein the action is at least one of incrementing a counter and notifying the sampling thread to sample the call stack information for each address within the set of identified addresses falling within the set of address ranges.

13. A computer program product for sampling call stack information, the computer program product comprising: a non-transitory computer readable storage medium; program code, stored on the non-transitory computer readable storage medium, responsive to identifying a set of interrupts, for determining whether all processors in a plurality of processors have generated the set of interrupts, wherein each of the plurality of processors is a processor unit that has a counter set after generating an interrupt and a determination as to whether all processors in the plurality of processors have generated the set of interrupts is made by checking all counters in the plurality of processors to determine that all counters have been set; program code, stored on the non-transitory computer readable storage medium, responsive to a determination that all of the processors have generated the set of interrupts, for receiving an identification for a set of executable code in a user input and converting the identification to a set of identified addresses for the set of executable code to form a set of address ranges; program code, stored on the non-transitory computer readable storage medium, for determining whether any address within the set of identified addresses falls within the set of address ranges; and program code, stored on the non-transitory computer readable storage medium, responsive to a determination that any address within the set of identified addresses falls within the set of address ranges, for notifying a sampling thread to obtain the call stack information.

14. The computer program product of claim 13 further comprising: program code, stored on the non-transitory computer readable storage medium, for receiving user input identifying at least one of the set of executable code and a set of data objects; and program code, stored on the non-transitory computer readable storage medium, for identifying the set of address ranges from the user input.

* * * * *